(12) United States Patent
Arthur et al.

(10) Patent No.: US 11,200,496 B2
(45) Date of Patent: Dec. 14, 2021

(54) HARDWARE-SOFTWARE CO-DESIGN OF NEUROSYNAPTIC SYSTEMS

(71) Applicant: INTERNATIONAL BUSINESS MACHINES CORPORATION, Armonk, NY (US)

(72) Inventors: John V. Arthur, Mountain View, CA (US); Pallab Datta, San Jose, CA (US); Steven K. Esser, San Jose, CA (US); Myron D. Flickner, San Jose, CA (US); Dharmendra S. Modha, San Jose, CA (US); Tapan K. Nayak, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1060 days.

(21) Appl. No.: 15/792,155

(22) Filed: Oct. 24, 2017

(65) Prior Publication Data
US 2019/0122114 A1    Apr. 25, 2019

(51) Int. Cl.
*G06N 3/08*  (2006.01)
*G06N 3/06*  (2006.01)
*G06N 3/04*  (2006.01)
*G06N 3/063* (2006.01)

(52) U.S. Cl.
CPC ............ *G06N 3/082* (2013.01); *G06N 3/049* (2013.01); *G06N 3/063* (2013.01)

(58) Field of Classification Search
CPC ......... G06N 3/082; G06N 3/049; G06N 3/063
See application file for complete search history.

(56) References Cited

U.S. PATENT DOCUMENTS

| | | | |
|---|---|---|---|
| 9,275,328 B1 | 3/2016 | Minkovich et al. | |
| 10,354,183 B2* | 7/2019 | Alpert | G06N 3/049 |
| 10,679,120 B2* | 6/2020 | Alpert | G06N 3/063 |
| 2016/0132765 A1 | 5/2016 | Alpert et al. | |
| 2016/0132767 A1* | 5/2016 | Alpert | G06N 3/063 |
| | | | 706/29 |
| 2016/0132769 A1* | 5/2016 | Alpert | G06N 3/10 |
| | | | 703/14 |
| 2016/0247062 A1 | 8/2016 | Amir et al. | |

(Continued)

OTHER PUBLICATIONS

Sawada et al.—"TrueNorth Ecosystem for Brain-Inspired Computing: Scalable Systems, Software, and Applications", IEEE, Nov. 2016, pp. 130-141. (Year: 2016).*

(Continued)

*Primary Examiner* — Paulinho E Smith
(74) *Attorney, Agent, or Firm* — Erik Huestis; Stephen Kenny; Foley Hoag LLP

(57) ABSTRACT

Hardware placement of neural networks is provided. In various embodiments, a network description is read. The network description describes a spiking neural network. The neural network is trained. An initial placement of the neural network on a plurality of cores is performed. The cores are located on a plurality of chips. Inter-chip communications are measured based on the initial placement. A final placement of the neural network on the plurality of cores is performed based on the inter-chip communications measurements and the initial placement. The final placement reduces inter-chip communication.

20 Claims, 15 Drawing Sheets

(56) References Cited

U.S. PATENT DOCUMENTS

| | | | |
|---|---|---|---|
| 2018/0032856 A1* | 2/2018 | Alvarez-Icaza | G06N 3/063 |
| 2018/0082182 A1* | 3/2018 | Amir | G06N 3/04 |
| 2018/0107918 A1* | 4/2018 | Amir | G06N 3/049 |
| 2018/0197075 A1* | 7/2018 | Modha | G06N 3/04 |
| 2018/0260682 A1* | 9/2018 | Amir | G06N 3/063 |
| 2019/0122114 A1* | 4/2019 | Arthur | G06N 3/082 |
| 2020/0097833 A1* | 3/2020 | Alpert | G06N 3/10 |

OTHER PUBLICATIONS

Ji, Yu, et al., "NEUTRAMS: Neural Network Transformation and Co-design Under Neuromorphic Hardware Constraints," Microarchitecture (MICRO), 2016 49th Annual IEEE/ACM International Symposium on, pp. 1-13, IEEE, 2016.

Sawada, Jun, et al., "Truenorth Ecosystem for Brain-inspired Computing: Scalable Systems, Software, and Applications," Proceedings of the International Conference for High Performance Computing, Networking, Storage and Analysis, IEEE Press, 2016, 12 pages.

Akopyan, Filipp, et al., "TrueNorth: Design and Tool Flow of a 65 mW 1 Million Neuron Programmable Neurasynaptic Chip," IEEE Transactions on Computer-Aided Design of Integrated Circuits and Systems 34.10 (2015): 1537-1557.

Stefanini, Fabio, et al., "PyNCS: a Microkernel for High-level Definition and Configuration of Neuromorphic Electronic Systems," Frontiers in neuroinformatics 8, (2014): 73.

\* cited by examiner

HARDWARE-SOFTWARE CO-DESIGN OF NEUROSYNAPTIC SYSTEMS

HARDWARE-SOFTWARE CO-DESIGN OF NEUROSYNAPTIC SYSTEMS

This invention was made with Government support under contract no. B613893 awarded by the Defense Advanced Research Projects Agency (DARPA). The Government has certain rights to this invention.

BACKGROUND

Embodiments of the present disclosure relate to hardware placement of a neural network, and more specifically, to hardware-software co-design of neurosynaptic systems.

BRIEF SUMMARY

According to embodiments of the present disclosure, methods of and computer program products for hardware placement of a neural network are provided. In various embodiments, a network description is read. The network description describes a spiking neural network. The neural network is trained. An initial placement of the neural network on a plurality of cores is performed. The cores are located on a plurality of chips. Inter-chip communications are measured based on the initial placement. A final placement of the neural network on the plurality of cores is performed based on the inter-chip communications measurements and the initial placement. The final placement reduces inter-chip communication.

DETAILED DESCRIPTION

Figure 1:
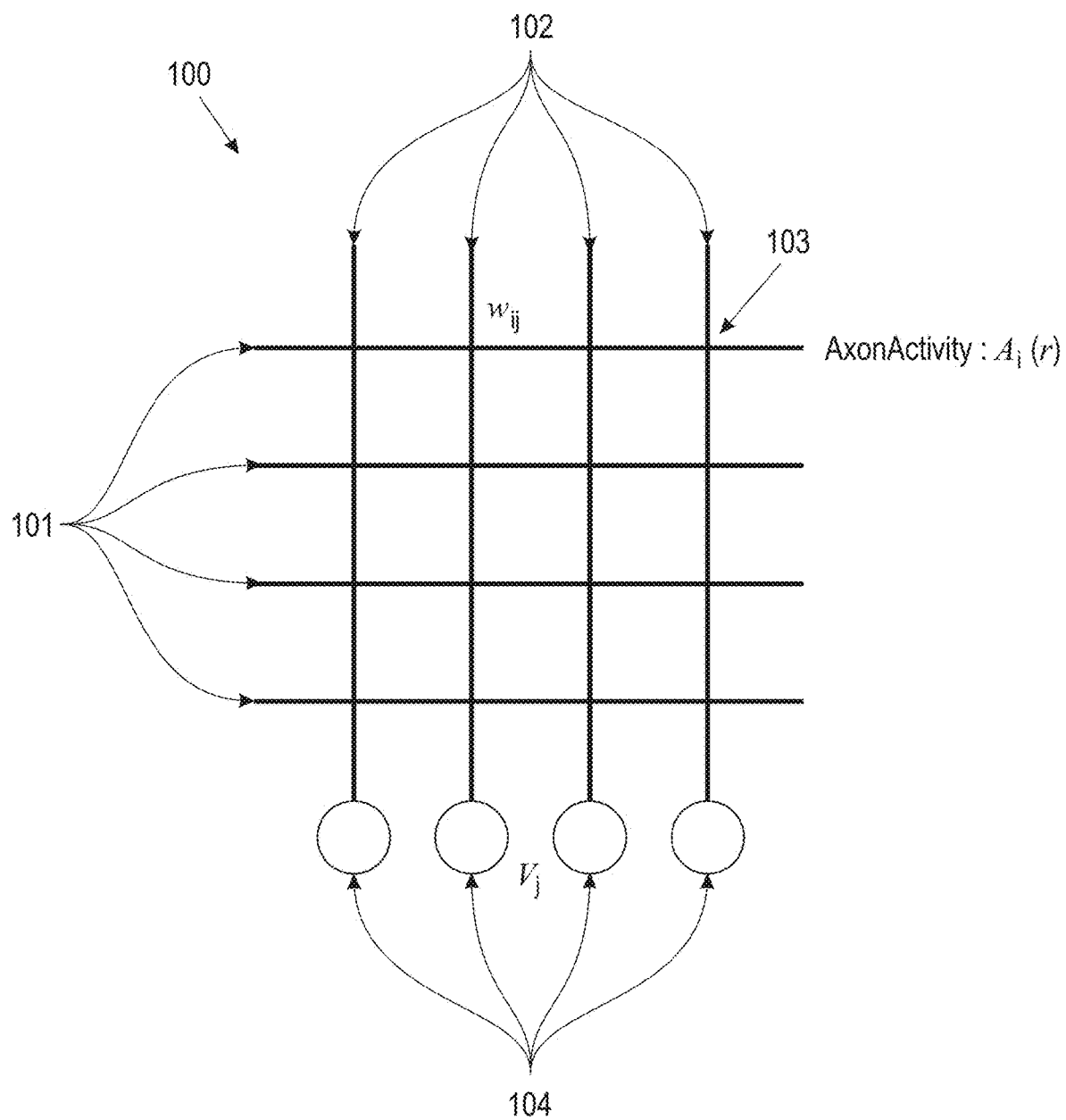
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

Various networks may be developed using, for example, the MatConvNet, Caffe, or TensorFlow training frameworks. The trained networks are converted into corelets using the Corelet programming Language (CPL). The Corelet programming paradigm permits construction of complex applications and cognitive algorithms while providing efficiency in deployment effectiveness for programmer productivity. In various basic workflows, such as discussed below with reference to FIG. 7, network mapping and training of neurosynaptic networks doesn't take into account the underlying hardware constraints of a multi-chip neurosynaptic board. The assumption is made that once the network has been trained, it can be mapped efficiently onto the multi-chip neurosynaptic substrate efficiently via a mapping process. However, this assumption does not universally hold, as the core parameters and the connection among the cores are specified by the training module and there is little room for placement to control the volume of traffic among the chips. Accordingly, the present disclosure provides a training framework and an efficient network construction with corelets that leverages information from the board level placement of neurosynaptic cores.

This disclosure provides techniques that leverage information provided by the placement step, which defines the physical location of every neurosynaptic core on the neurosynaptic substrate). These techniques provide various advantages, including efficient Corelet construction (after network training is complete) and optimizing the training parameters at the network definition level. This allows tuning of the network with respect to the structure of the network and the dynamics of the network via tuning parameters available at the training interface.

Instead of providing a purely post-training optimization procedure for mapping trained neurosynaptic networks onto the neurosynaptic substrate, the present disclosure provides for bubbling back placement as an integral element of the constrain and train approach to training. In this way, better neurosynaptic networks are designed that are more amenable to mapping on the neurosynaptic substrate. In addition, training algorithms may be tuned to find more efficient solutions that are efficient for the underlying hardware substrate. Hardware resources are further optimized by efficiently constructing Corelets that can maximize the use of the underlying hardware, while also trying to meet some of the constraints imposed by the hardware substrate. With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
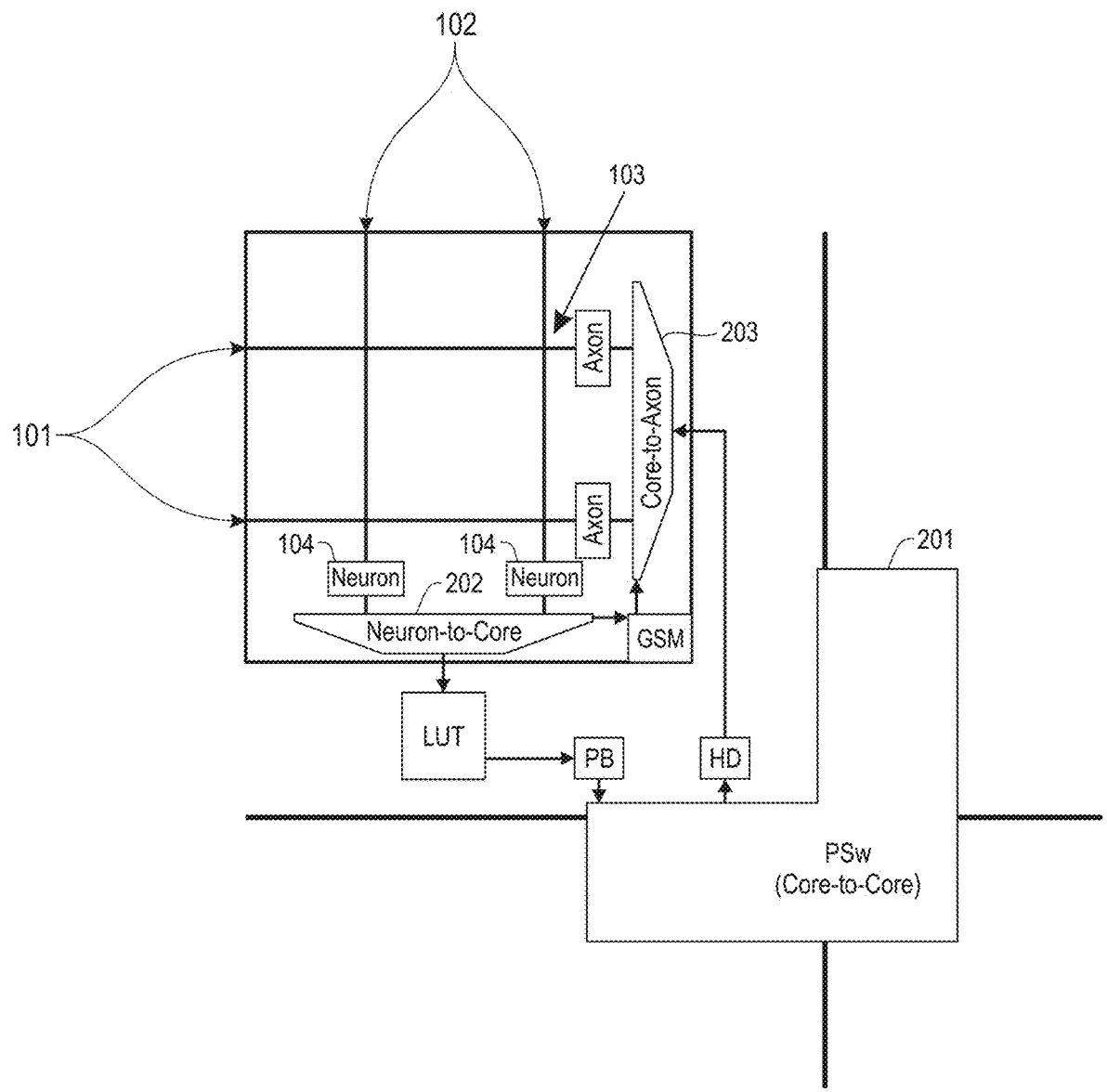
FIG. 2 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Figure 3:
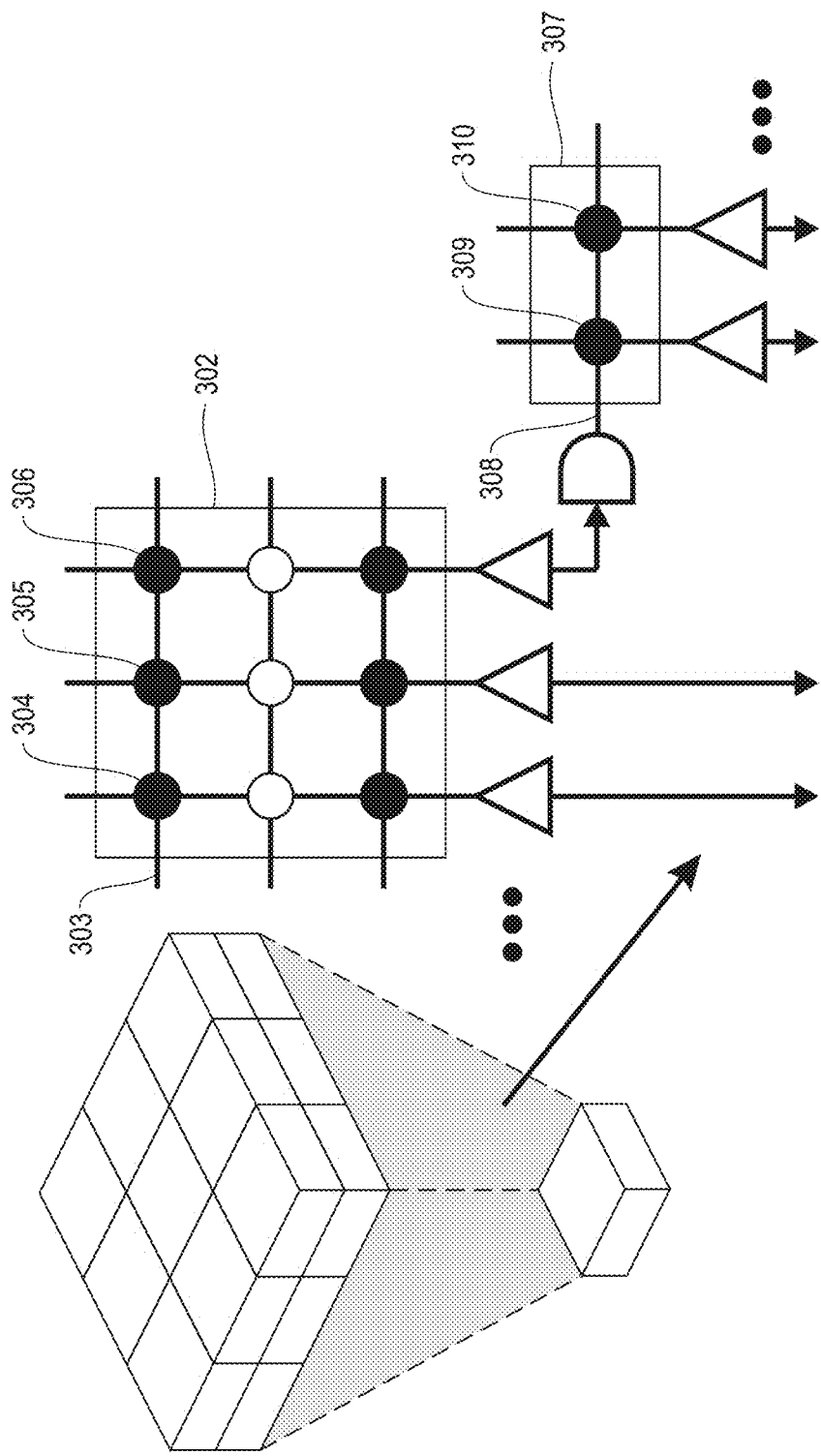
FIG. 3 illustrates splitter use in exemplary neuromorphic systems.

With reference now to FIG. 3, splitter use in exemplary neuromorphic systems is illustrated. In exemplary systems such as TrueNorth, a neuron can target only a single core. To address this, copies are used. Natural copies are those that use otherwise unused neurons on the same core. For example, in core 302, multiple copies of a single input 303 may be generated at synapses 304 . . . 306. Splitter copies are those that use additional cores. For example, in core 307, input 308 is split to outputs 309 . . . 310.

Figure 4:
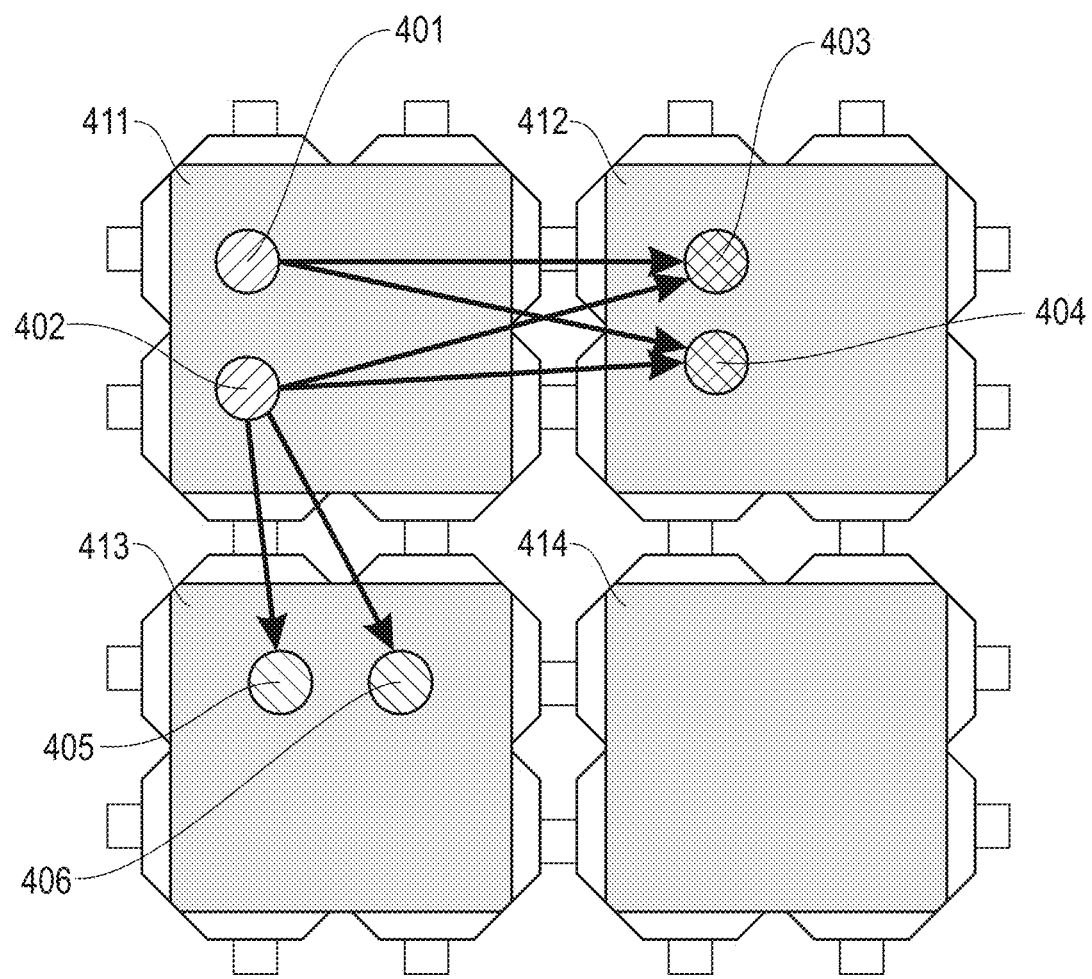
FIGS. 4-6 illustrate various exemplary corelet placement scenarios.
Figure 5:
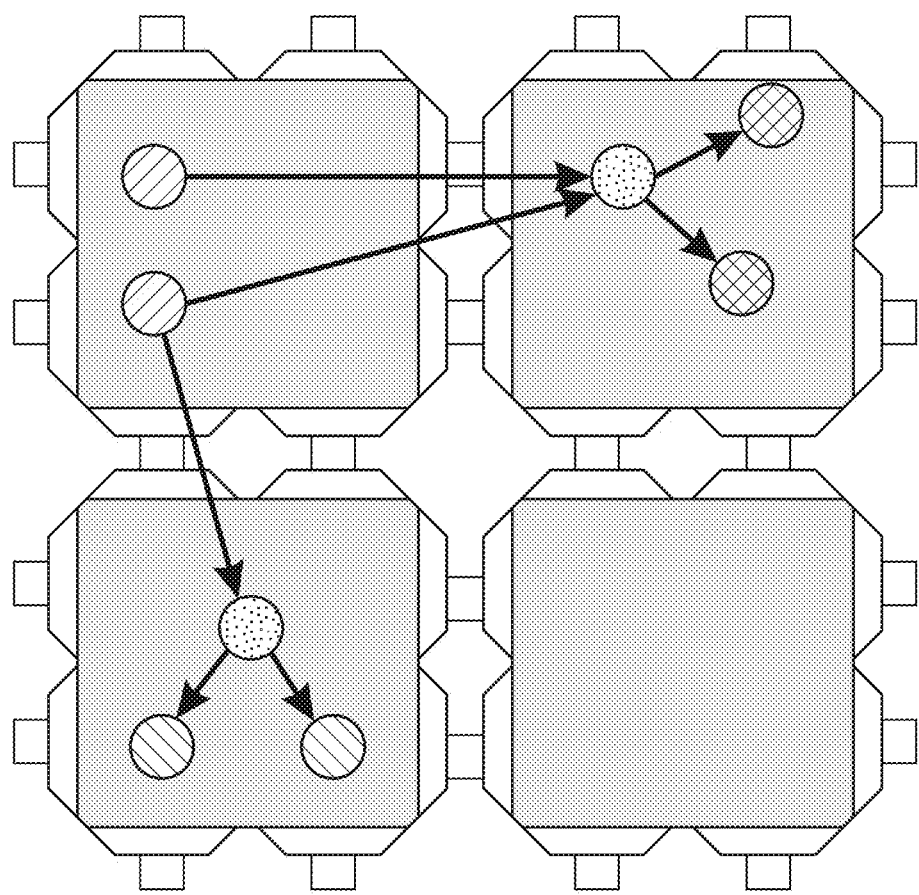
Figure 6:
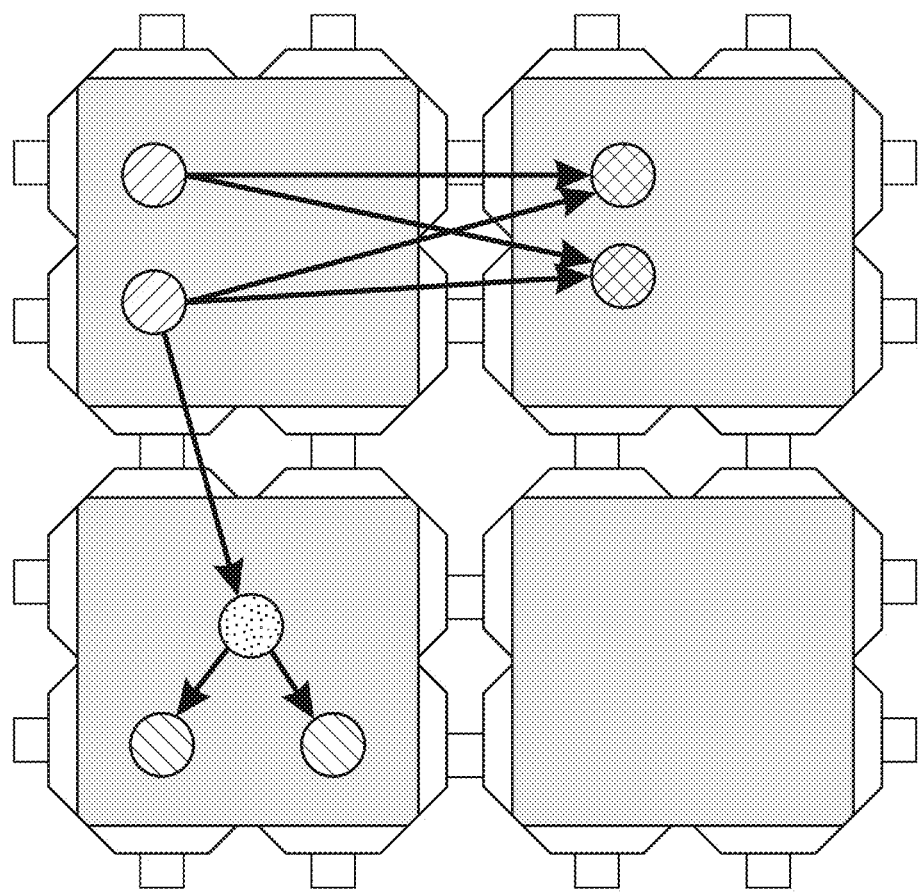

Referring to FIGS. 4-6, various exemplary corelet placement scenarios are illustrated. In FIG. 4, cores are 401 . . . 406 are allocated among chips 411 . . . 414. In this example, crossbar reuse is high and the number of total cores is minimized. However, this example also has high chip-to-chip traffic. In FIG. 5, chip-to-chip traffic is reduced, but more cores are required. FIG. 6 illustrates a hybrid solution, that attempts to minimize chip-to-chip traffic while providing the best reuse of the crossbar and minimizing the total number of cores.

Figure 7:
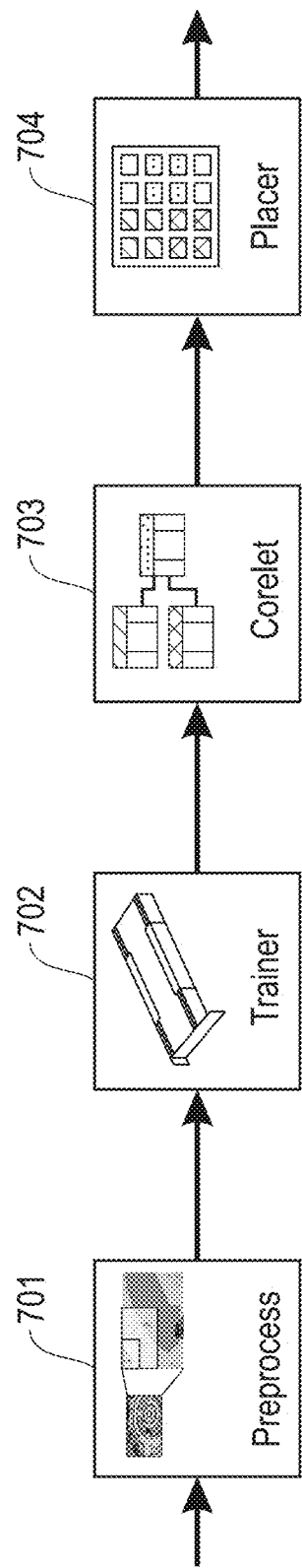
FIG. 7 illustrates an exemplary placement workflow.

Referring to FIG. 7, an exemplary placement workflow is illustrated. In this workflow, placement is an entirely post-training procedure. A network description (ND) is provided from preprocessing 701 to a sole trainer 702. A corelet construction 703 is determined based on the trained network, which in turn is passed for placement 704. As noted above, placement that is entirely post-training may result in sub-optimal results. Accordingly, the present disclosure addresses how to bubble back placement within the constrain and train approach in order to meet real-time guarantees.

Figure 8:
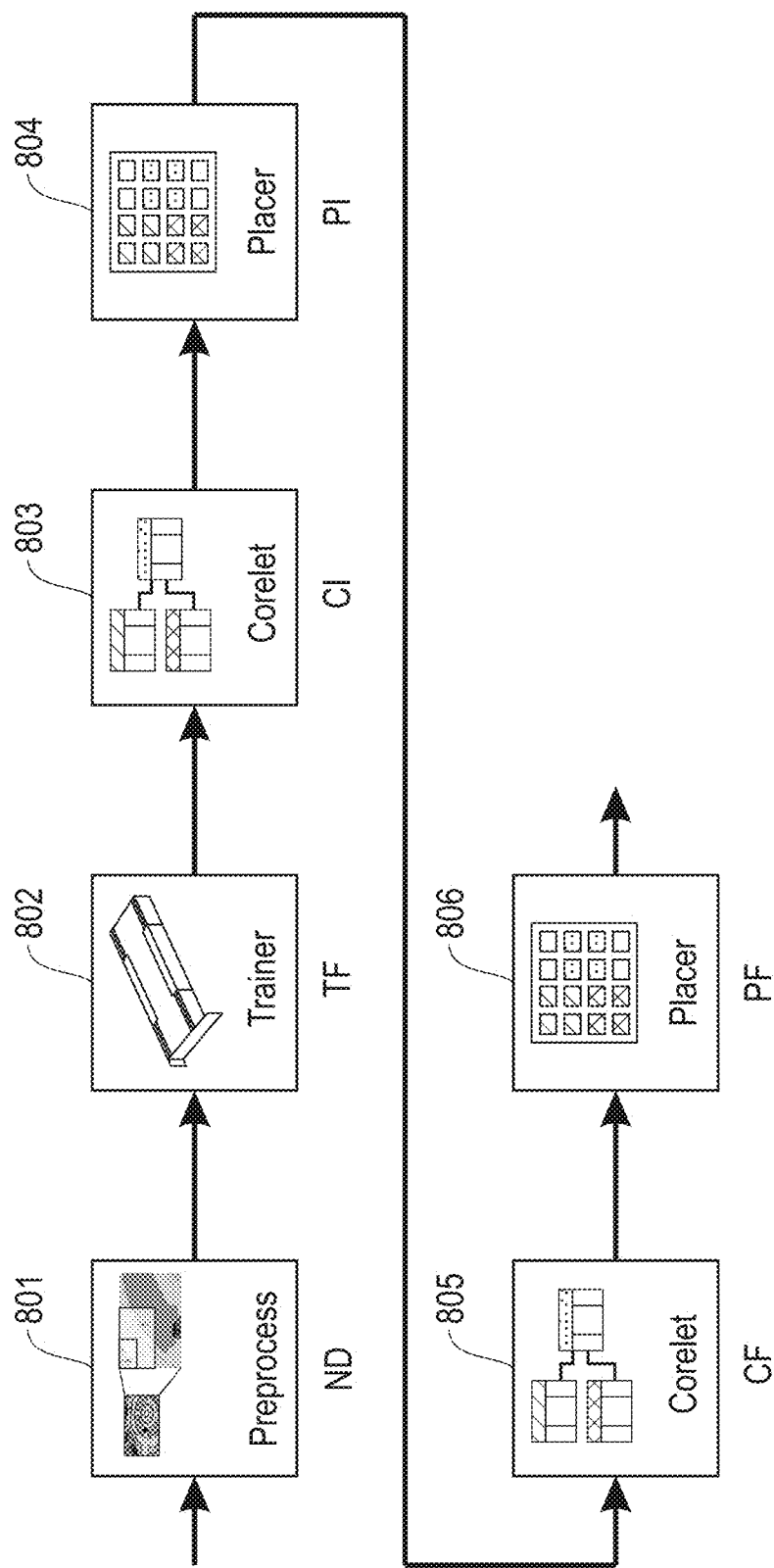
FIG. 8 illustrates a placement workflow according to embodiments of the present disclosure.

Referring to FIG. 8, a placement workflow according to the present disclosure is illustrated. A network description (ND) is provided from preprocessing 801 to a sole trainer 802. An intermediate corelet construction (CI) 803 is determined based on the trained network, which in turn is passed for initial placement (PI) 804. Based on the results of the initial placement, a final corelet construction (CF) 805 is determined. Based on the final corelet construction (CF), a final placement (PF) 806 is determined.

One way in which to optimize the corelet construction to minimize the spike bandwidth across chips while also maximizing utilization of cores is illustrated. Once a network is specified in a training framework such as MatConvNet, TensorFlow, or Caffe, the physical number of cores required to map that network on the underlying hardware substrate is computed. Assuming that the network topology consumes at least K neurosynaptic chips, and assuming that a neurosynaptic chip includes, e.g., 4096 cores, there may be a small number of leftover cores on each chip. The below algorithm uses these leftover cores most optimally to minimize spike traffic across chips, so that when mapped onto the underlying physical substrate the network can achieve better run-time performance, because it is able to meet the spike bandwidth limitations between the chips and minimizes cross-chip communication.

According to various embodiments of the present disclosure, a network structure definition is generated within, e.g., MatConvNet via layer definition. Training is performed to generate a network representation file. During training, spike statistics are collected for all cores across all layers. Corelet and placement is then generated via a placement algorithm. One example of a suitable placement algorithm is the NSCP (NeuroSynaptic Core Placement Algorithm).

Placement results in physical coordinates (e.g., chip x,y and core x,y) for every core in the network. From the graph, the set of cores which has cross chip edges is generated. This set of cores can be broken down across for each layer. The set of cores is partitioned into K(L−1)(K−1) bins, where K is the total number of chips used and L is the total number of layers in the network.

During training, statistics are accumulated for the K(L−1)(K−1) bins. The (L−1) layer pairs are sorted by their accumulated spike counts in the K(K−1) corresponding bins, where edge counts represent spikes.

For each layer pair in the sorted list, the K(K−1) bins are sorted by their accumulated spike counts to generate a sorted list M. For each element in M, a list is available of all cores that cause off-chip traffic between any two corresponding chips $C_m$ and $C_n$. The number of cores required to eliminate natural copies between this chip-pair is designated $C_{mn}$. The number of cores used on chip $C_n$ is designated $C_n^{used}$. The number of cores available on chip $C_n$ is designated $C_n^{available}$. Given a system with 4096 cores per chip, $C_n^{available}=4096-C_n^{used}$. The number of reconfigurable cores is then $\min(C_{mn}, C_n^{available})$. Reconfigurable cores are then tagged as reconfigurable during corelet generation.

Given the list of tagged cores, post-chip splitting is introduced and the remaining network is re-balanced by introducing a delay (e.g., of 1 tick) to the non-split or natural copy neurons in the appropriate layers.

The above approach to post-chip splitting is also applicable to other blocks of cores connected across chips. For example, if a set of cores has lower connectivity within a chip and higher connectivity across chips, then the entire block of cores can be re-allocated at the target chip, thus minimizing cross chip edge cost.

In various embodiments, placement-aware network topology optimization is provided. As set forth below, networks are constructed that lead to network topology (in terms of structural connectivity) that is more amenable for multi-chip placement solutions. In various embodiments, the network topology is specified in a network template definition, for example in MATLAB.

Figure 9:
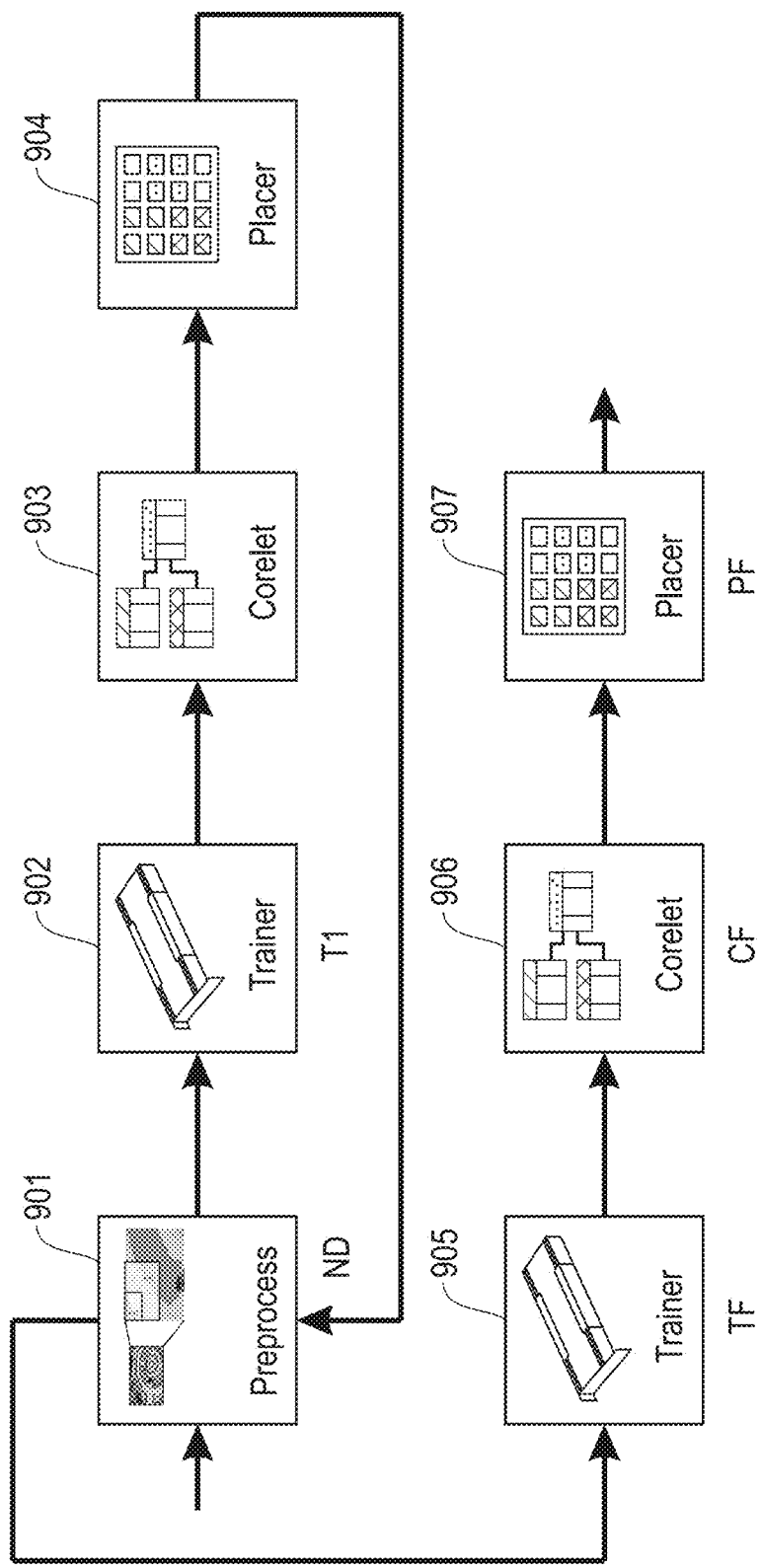
FIGS. 9-11 illustrate additional placement workflows according to embodiments of the present disclosure.
Figure 10:
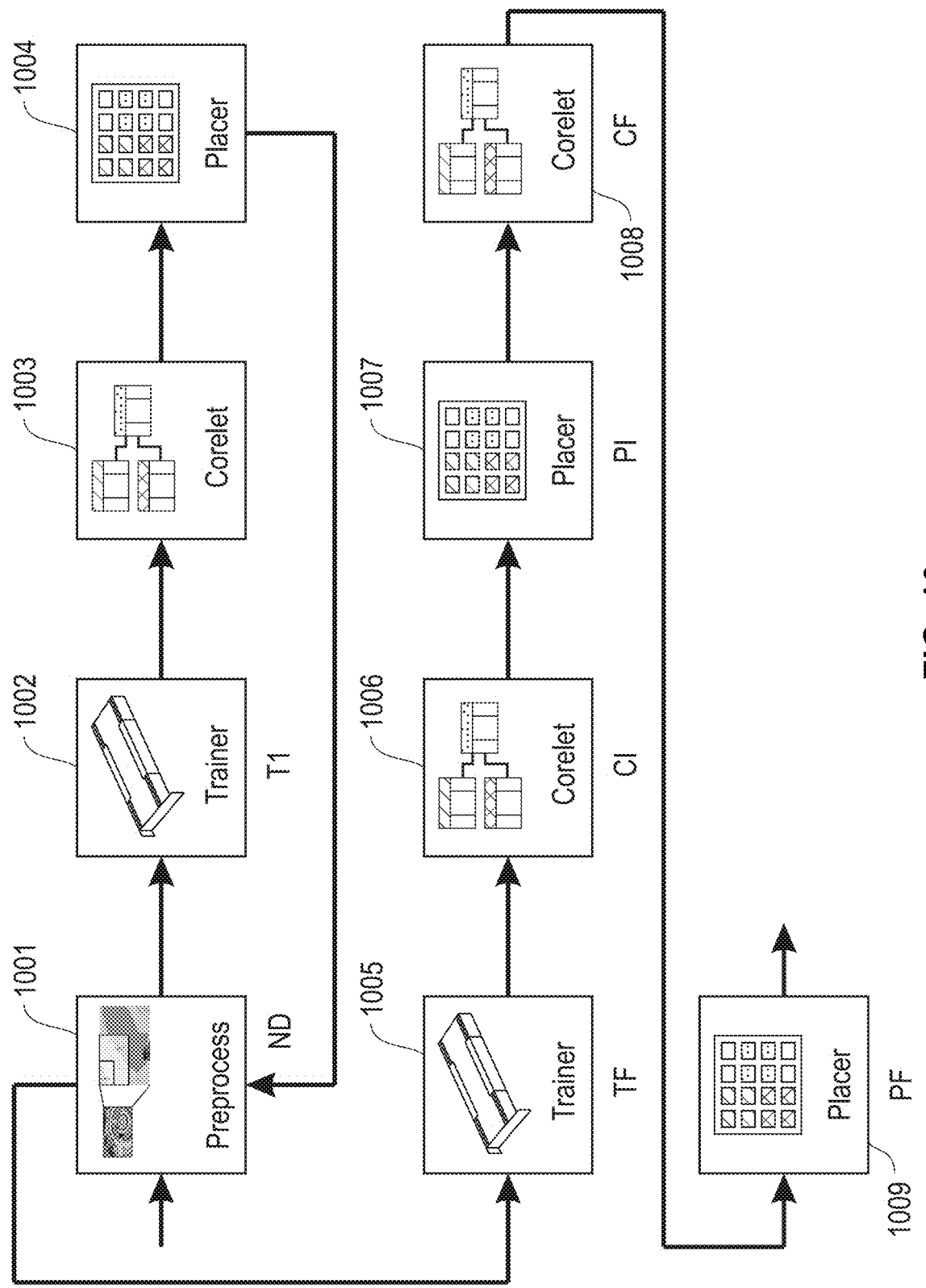
Figure 11:
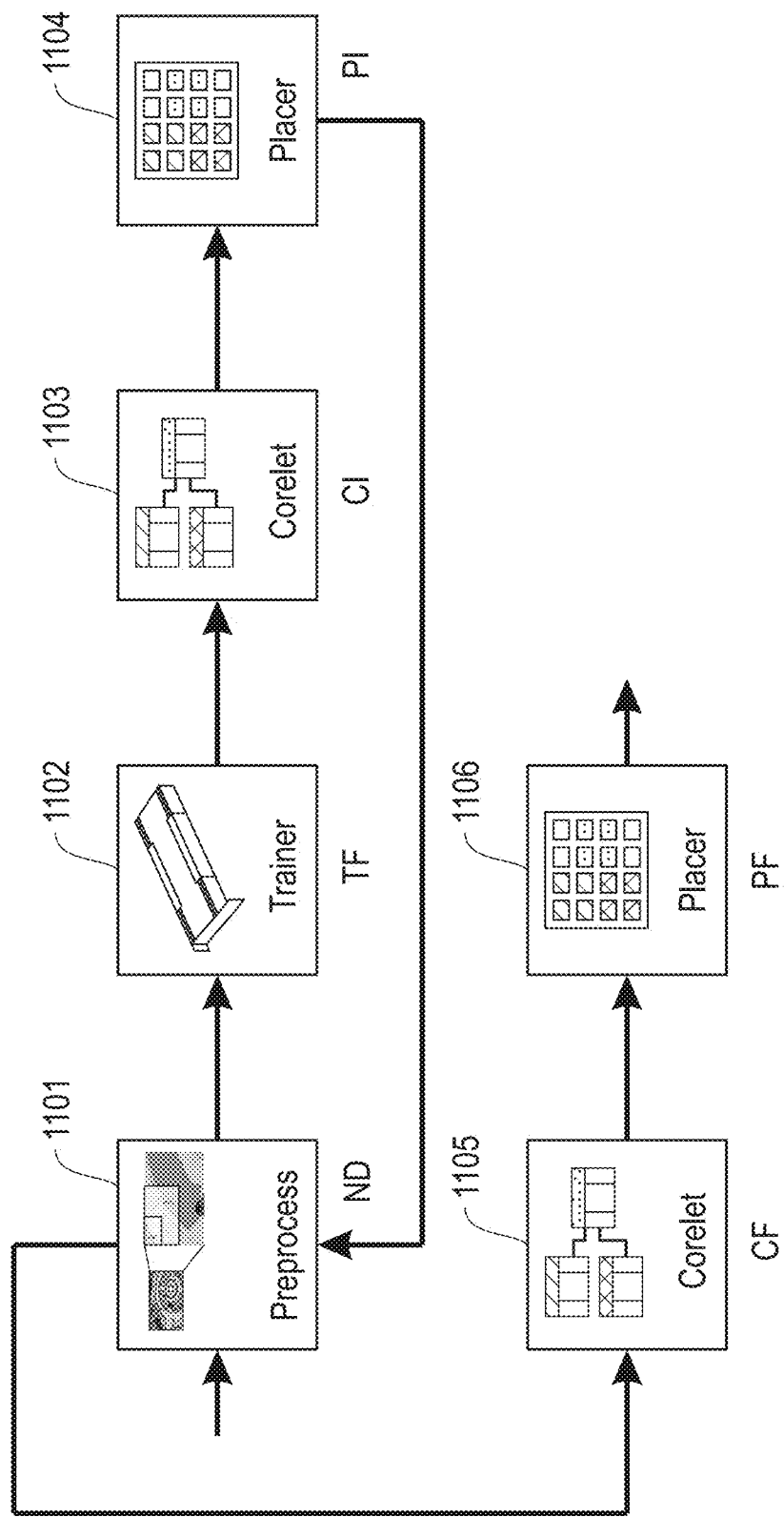

Referring now to FIGS. 9-11, exemplary workflows are illustrated that enable iteration between network specification, corelet generation, and pre-placement. This allows repeated re-tuning of the network specification to determine placement of the cores in terms of changing underlying network topology due to change in network parameter specification.

For example, given a convolution layer which uses a kernel of size K×K with a stride of 1, the number of edges of the underlying graph that cross the chip boundaries can be determined. As stride is changed to, e.g., 2, it is determined how that changes the underlying construction of the network topology and how that reduces the number of edges crossing chip boundaries. Hence, a user can tune network structure and directly see the impact on its change on the underlying physical substrate, before training the entire network (which can be very time consuming process for a large network).

Referring to FIG. 9, a placement workflow according to the present disclosure is illustrated. A network description (ND) is provided from preprocessing 901 to initial trainer (TI) 902. An intermediate corelet construction (CI) 903 is determined based on the trained network, which in turn is passed for initial placement (PI) 904. The placement is returned for further preprocessing 901. Final training (TF) 905 is performed based on any further preprocessing. A final corelet construction (CF) 906 is determined. Based on the final corelet construction (CF), a final placement (PF) 907 is determined.

Referring to FIG. 10, a placement workflow according to the present disclosure is illustrated that combines network optimization and corelet optimization. A network description (ND) is provided from preprocessing 1001 to initial trainer (TI) 1002. An intermediate corelet construction (CI) 1003 is determined based on the trained network, which in turn is passed for initial placement (PI) 1004. The placement is returned for further preprocessing 1001. Final training (TF) 1005 is performed based on any further preprocessing. An intermediate corelet construction (CI) 1006 is determined. Based on the intermediate corelet construction (CI), an intermediate placement (PI) 1007 is determined. A final corelet construction (CF) 1008 is then determined. Based on the final corelet construction (CF), a final placement (PF) 1009 is determined.

Referring to FIG. 11, a placement workflow according to the present disclosure is illustrated that supports tuning of layer parameters such as spikeDecay or sparsity. SpikeDecay is a training parameter that controls the spiking rate of the neurons. Sparsity of a network adds constraints on the connectivity between two layers resulting in localized connectivity. A network description (ND) is provided from preprocessing 1101 to final trainer (TF) 1102. An intermediate corelet construction (CI) 1103 is determined based on the trained network, which in turn is passed for initial placement (PI) 1104. The placement is returned for further preprocessing 1101. A final corelet construction (CF) 1105 is determined based on any further preprocessing. Based on the final corelet construction (CF), a final placement (PF) 1106 is determined.

Figure 12:
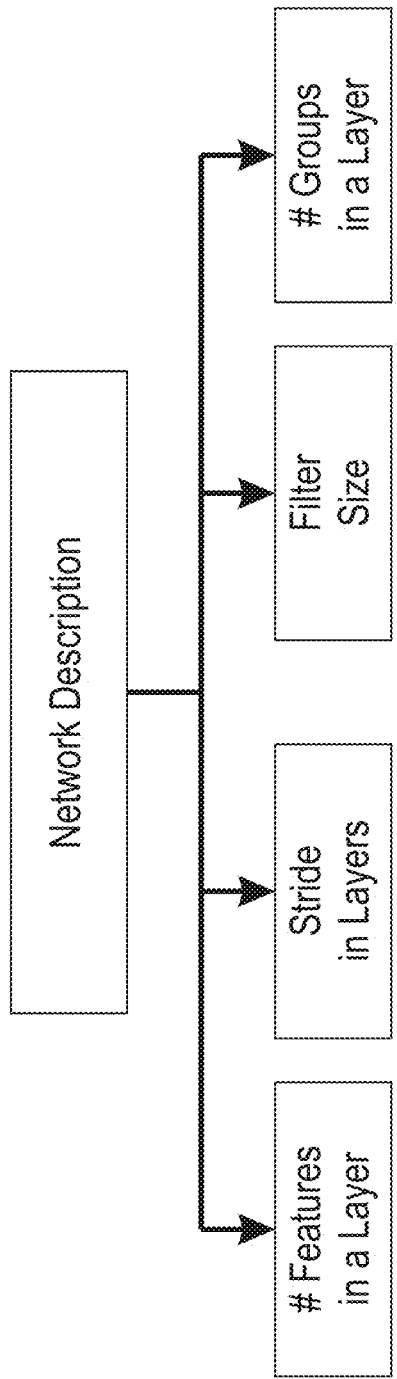
FIG. 12 illustrates network parameter changes according to embodiments of the present disclosure.

Referring to FIG. 12, some of the possible parameter changes that an user can perform after an initial network description that will change the underlying topology of the network being constructed and the corresponding placement of those cores. As illustrated by the prior figures, a user can iterate in a loop between changing network parameters, corelet construction, and placement to see the underlying changes in the structure of the network/graph of cores being constructed before even resuming training.

Figure 13:
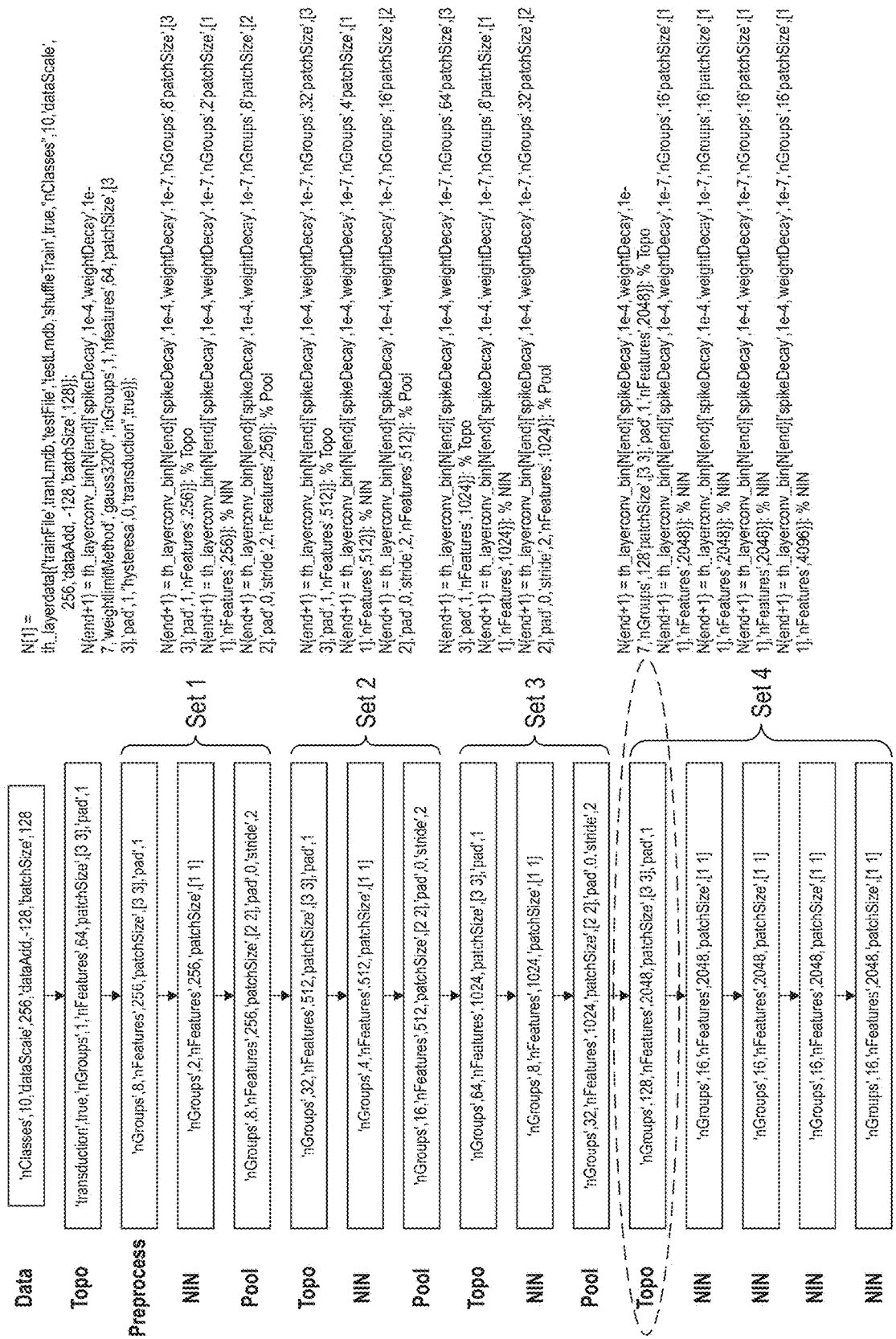
FIG. 13 illustrates an exemplary network for optimization according to embodiments of the present disclosure.

Referring to FIG. 13, in one example, for a given 4 chip CIFAR 100 network, the stride parameter in one of the layers of the network definition is altered. The exemplary network includes 4 sets of Network in Network (NIN), Topological Convolution (Topo), and Pooling Layers in the stack. This network can be mapped using 15,748 cores and the following are the statistics of the placement layout: Total WireLength: 15087727; mean Hop Distance: 18; max Hop Distance: 203; total Ports Traffic: 199680; mean Traffic across Ports: 12480; max Traffic across Ports: 24064; Accuracy— 88.0%; Run time Performance: 0.68 ms.

If the stride parameter in the indicated Topo Layers in the stack of Layers is changed to 3, this network can then be mapped using 14980 cores. The following are the statistics of the updated placement layout: Total WireLength:

13015939; mean Hop Distance: 17; max Hop Distance: 203; total Ports Traffic: 150528; mean Traffic across Ports: 9408; max Traffic across Ports: 17856; Accuracy—87.12%; Run time Performance: 0.58 ms.

Thus, in this example, there is a 4.88% reduction in cores, 24.62% reduction in overall cross-chip Traffic, 13.73% reduction in overall wirelength, 24.62% reduction in mean traffic across chips across any port, and 25.80% reduction in the max traffic across any chip. These improvements lead to an overall improvement of 14.71% in run-time performance without impacting classification accuracy.

In various embodiments, placement aware training optimization is provided. Different network parameters are tuned to help in training networks that have more desirable firing rates and neuronal dynamics and are tuned to the underlying substrate constraints. Placement information may be used as part of training as set out herein.

Once a network is initially placed, it is known exactly which cores leads to cross chip traffic for any K chips in the system and for each layer of the network. During training, statistics are accumulated for all the K(L−1)(K−1) bins that lead to cross-chip communication. Training may then be tuned informatively. spikeDecay can be tuned specifically for specific layers that cause large bursts. Layer specific parameters can be tuned to see how it impacts cross-chip traffic between K chips. Constraints or bounds can be imposed on cross-chip communication that makes it possible to run the trained network in real-time.

Placement can also be used to tune training as set forth above. Each K(K−1) bins can be indexed within each layer and so monitor spike activity for a particular layer of the network. This allows determination of the set of cores in a layer that send large numbers of spikes across chip boundaries across the ports connecting any two chips $C_i$ and $C_j$. If the number of spikes for any such {layer, bin} tuple exceeds the hardware limits, the specific layer may be tuned. For example, the spike decay parameter can be increased in the training for that layer. Weight decay can be adjusted. Weight decay is a training parameter that is used to update the real valued weights during training using backpropagation to trinary weights (−1, 0, +1). The topological construct can also be changed by changing the training script.

Figure 14:
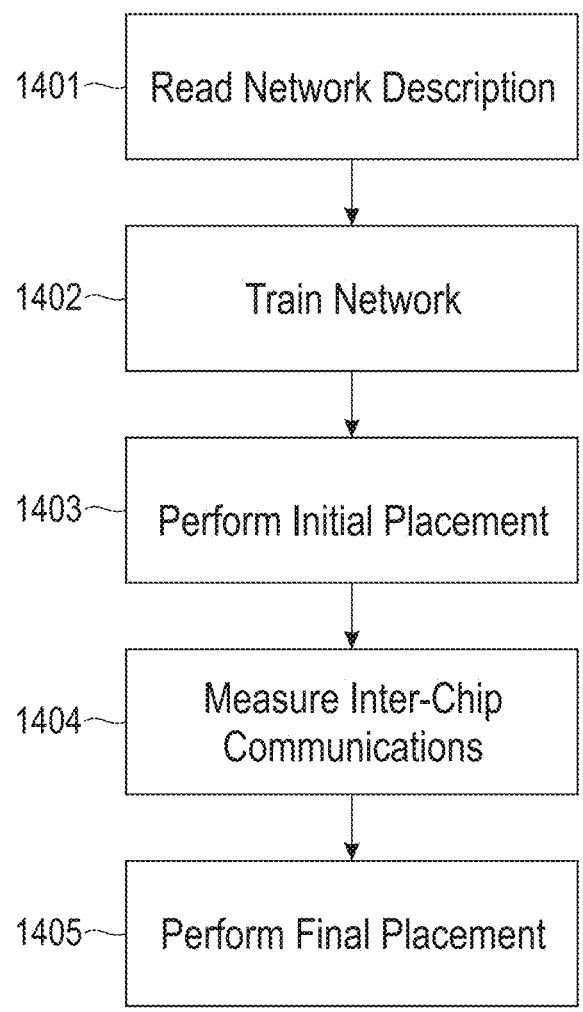
FIG. 14 illustrates a method for hardware-software co-design of neurosynaptic systems according to embodiments of the present disclosure.

Referring to FIG. 14, a method for hardware placement of a neural network is illustrated according to embodiments of the present disclosure. At 1401, a network description is read. The network description describes a spiking neural network. At 1402, the neural network is trained. At 1403, an initial placement of the neural network on a plurality of cores is performed. The cores are located on a plurality of chips. At 1404, inter-chip communications are measured based on the initial placement. At 1405, a final placement of the neural network on the plurality of cores is performed based on the inter-chip communications measurements and the initial placement. The final placement reduces inter-chip communication.

Applying the present disclosure, one can design neurosynaptic systems that both arrive at a solution for a given problem definition and are feasible given the HW constraints and restrictions of the underlying substrate. Although other network designs may be adopted, that are feasible in software, there is no guarantee that they will achieve the run-time performance on the underlying hardware substrate. Using the approaches described herein, one can design neurosynaptic systems in software and arrives at solutions that are optimized to be operational within the boundaries of the physical HW constraints.

The present disclosure provides for joint frameworks for designing neurosynaptic systems with hardware-software co-optimization. Such frameworks allow design of networks and corelets that can maximize the use of neurosynaptic cores and minimize cross-chip communication. Such frameworks enable users to have visibility in the mapping of the network layout as they change parameters within a very high-level network description language. Users can see impact of neuronal dynamics per-layer and their impact on the underlying hardware substrate. Users can tune network parameters to control spiking dynamics per layer in the network such that it meets hardware bandwidth constraints while keeping performance (accuracy of the trained network) unchanged. Users receive insight to the structure of networks that they design at the highest level and the impact of a change in parameter in the network definition to the physical layout of the network on the hardware substrate (without waiting for network training to complete). Users can train and design networks in software that are feasible to be not only mapped onto hardware but also feasible to be within the operational regime that the hardware permits.

Figure 15:
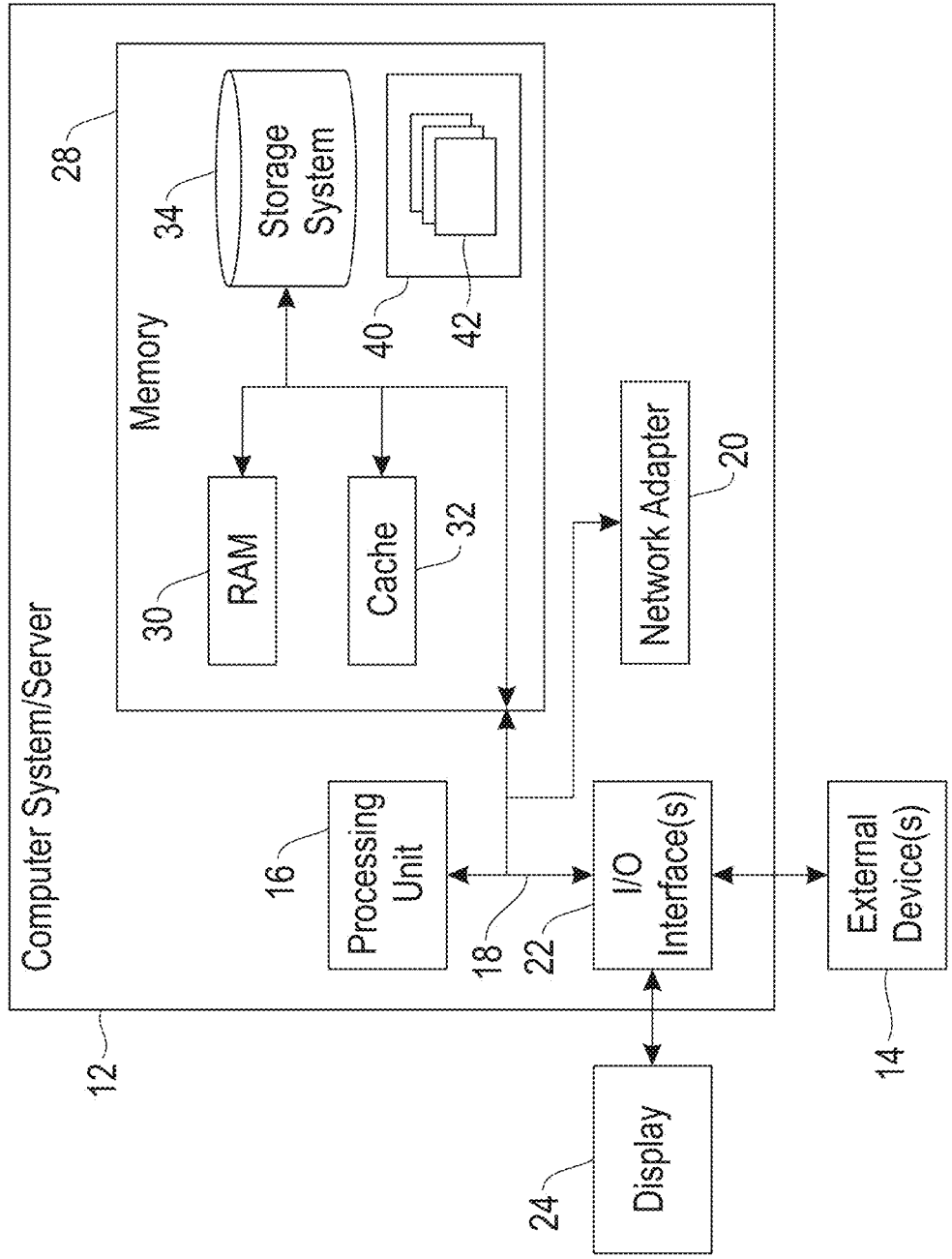
FIG. 15 depicts a computing node according to an embodiment of the present invention.

Referring now to FIG. 15, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   reading a network description, the network description describing a spiking neural network;
   training the neural network;
   performing an initial placement of the neural network on a plurality of cores, the cores located on a plurality of chips;
   measuring inter-chip communications based on the initial placement;
   performing a final placement of the neural network on the plurality of cores based on the inter-chip communications measurements and the initial placement, the final placement reducing inter-chip communication.

2. The method of claim 1, wherein performing the final placement comprises:
   locating an unused core on a first of the plurality of chips based on the initial placement;
   relocating at least one core from a second of the plurality of chips to the unused core.

3. The method of claim 1, further comprising:
   providing summary statistics to a user describing the initial placement.

4. The method of claim 3, wherein the summary statistics comprise core locations in the initial placement.

5. The method of claim 3, wherein the summary statistics comprise inter-chip communications measurements in the initial placement.

6. The method of claim 3, further comprising:
   receiving one or more parameter adjustment to the training of the neural network from the user;
   generating an intermediate placement of the neural network based on the one or more parameter adjustments.

7. The method of claim 6, further comprising:
   repeating said receiving and generating until a predetermined substrate or performance constraint is met.

8. The method of claim 6, wherein the one or more parameter adjustment includes features per layer, stride, filter size, spike decay, or number of groups per layer.

9. The method of claim 6, wherein the one or more parameter adjustment is applied to one of a plurality of layers of the neural network.

10. The method of claim 6, further comprising:
    generating further intermediate placements based on further parameter adjustments.

11. The method of claim 1, wherein measuring inter-chip communications comprises determining spike count for at least one edge of the neural network.

12. The method of claim 1, wherein performing the final placement comprises:
    receiving one or more parameter adjustment to the training of the neural network from the user;
    generating an intermediate placement of the neural network based on the one or more parameter adjustments;
    repeating said receiving and generating until a predetermined substrate or performance constraint is met;
    locating an unused core on a first of the plurality of chips based on the initial placement;
    relocating at least one core from a second of the plurality of chips to the unused core.

13. A system comprising:
    a computing node comprising a computer readable storage medium having program instructions embodied therewith, the program instructions executable by a processor of the computing node to cause the processor to perform a method comprising:

reading a network description, the network description describing a spiking neural network;

training the neural network;

performing an initial placement of the neural network on a plurality of cores, cores located on a plurality of chips;

measuring inter-chip communications based on the initial placement;

performing a final placement of the neural network on the plurality of cores based on the inter-chip communications measurements and the initial placement, the final placement reducing inter-chip communication.

14. A computer program product for hardware placement of a neural network, the computer program product comprising a computer readable storage medium having program instructions embodied therewith, the program instructions executable by a processor to cause the processor to perform a method comprising:

reading a network description, the network description describing a spiking neural network;

training the neural network;

performing an initial placement of the neural network on a plurality of cores, cores located on a plurality of chips;

measuring inter-chip communications based on the initial placement;

performing a final placement of the neural network on the plurality of cores based on the inter-chip communications measurements and the initial placement, the final placement reducing inter-chip communication.

15. The computer program product of claim 14, wherein performing the final placement comprises:

locating an unused core on a first of the plurality of chips based on the initial placement;

relocating at least one core from a second of the plurality of chips to the unused core.

16. The computer program product of claim 14, further comprising:

providing summary statistics to a user describing the initial placement.

17. The computer program product of claim 16, further comprising:

receiving one or more parameter adjustment to the training of the neural network from the user;

generating an intermediate placement of the neural network based on the one or more parameter adjustments.

18. The computer program product of claim 17, further comprising:

repeating said receiving and generating until a predetermined substrate or performance constraint is met.

19. The computer program product of claim 14, wherein measuring inter-chip communications comprises determining spike count for at least one edge of the neural network.

20. The computer program product of claim 14, wherein performing the final placement comprises:

receiving one or more parameter adjustment to the training of the neural network from the user;

generating an intermediate placement of the neural network based on the one or more parameter adjustments;

repeating said receiving and generating until a predetermined substrate or performance constraint is met;

locating an unused core on a first of the plurality of chips based on the initial placement;

relocating at least one core from a second of the plurality of chips to the unused core.

* * * * *